United States Patent Office 3,053,623
Patented Sept. 11, 1962

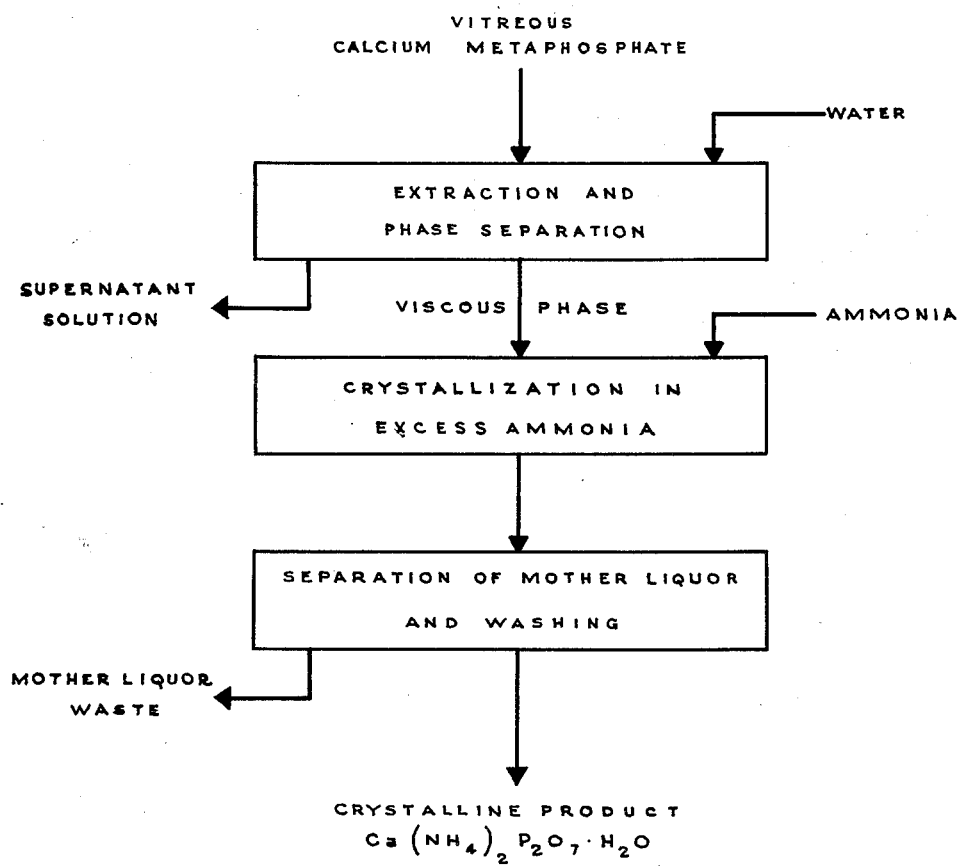

3,053,623
MONOCALCIUM DIAMMONIUM
PYROPHOSPHATE
Earl H. Brown, Sheffield, Ala., assignor to Tennessee
Valley Authority, a corporation of the United States
Filed June 3, 1959, Ser. No. 817,953
1 Claim. (Cl. 23—107)
(Granted under Title 35, U.S. Code (1952), sec. 266)

The invention herein described may be manufactured and used by or for the Government for governmental purposes without payment to me of any royalty thereon.

This invention is a new pyrophosphate and a process for its production.

Principal objects of this invention are to provide a new material suitable for fertilizer and for other uses and to provide a process for its manufacture.

The new material is monocalcium diammonium pyrophosphate. It is different from the material disclosed in my co-pending application, Serial No. 817,956, filed June 3, 1959, in that the material there shown represents more advanced or complete degradation. It may be produced by a process which comprises extracting pure, finely divided vitreous calcium metaphosphate with water, thereby producing a heavy, substantially water-insoluble viscous phase and a supernatant aqueous solution of water-soluble degradation products; continuously withdrawing the supernatant solution of degradation products during formation of the viscous-phase extract; separating the viscous phase from residual solution; adding excess ammonium hydroxide to the separated viscous phase; holding the resulting mixture until spherulitic crystals form; and separating resulting crystals of monocalcium diammonium pyrophosphate from mother liquor.

Either chemically pure or fertilizer-grade calcium metaphosphate may be used as starting material. When fertilizer-grade calcium metaphosphate is the starting material, the extract consists of a single viscous phase, apparently because the presence of silica causes the degradation reaction to occur at a rate faster than phases separate under the influence of gravity. This single viscous phase is treated exactly as is described above for the viscous phase resulting from extraction of pure calcium metaphosphate, after its separation from supernatant solution. In either case the end result is the same, except that the final product of monocalcium diammonium pyrophosphate is slightly more impure when fertilizer-grade metaphosphate is used as starting material.

The attached drawing is a flowsheet illustrating diagrammatically one process for the preparation of this new material. The starting material in the process illustrated is pure vitreous calcium metaphosphate. The calcium metaphosphate is ground to a degree of fineness which will depend somewhat upon the type of extraction used. For example, simple percolation of water through a bed of crushed calcium metaphosphate at room temperature is one satisfactory method for carrying out extraction.

When this method is used, calcium metaphosphate preferably is in particles from −20 to +60 mesh in size. Inclusion of much material fine enough to pass a 60-mesh screen will cause a bed of calcium metaphosphate particles to mat or stick together, and the resulting mass does not have sufficient voids to permit free passage of liquid. Preferably, the extraction may be carried out with use of a stirring device arranged to keep the particles of calcium metaphosphate in motion in extraction water. When extraction is conducted in this manner, the calcium metaphosphate may be of small particle size since the material does not adhere while it is in motion in water, and the advantage of greater surface contact with extraction water can be attained.

I have found that when pure calcium metaphosphate is the starting material the extract consists of two phases: (1) a heavy viscous phase, substantially immiscible with water, and (2) a supernatant dilute aqueous solution of degradation products of calcium metaphosphate. The supernatant aqueous phase is formed in much greater volume than the heavy viscous phase, but it contains relatively little phosphate. The supernatant solution must be drawn off continuously as it is formed if any reasonable degree of purity of the viscous-phase material is to be attained, because the aqueous solution may become sufficiently concentrated in shorter chain calcium metaphosphate polymers to cause the material in the two phases to become partially miscible in each other.

When the supernatant solution is continuously drawn off, the viscous phase is a sirupy mixture of hydrated polymers of calcium metaphosphate containing about 30 to 60 percent of $Ca(PO_3)_2$ polymerized in long-chain molecules. When extraction is complete, the heavy viscous phase is separated from any residual supernatant solution. The separated viscous phase is then withdrawn to a closed vessel, and an excess of concentrated ammonia is added. An amorphous precipitate of undetermined composition is formed. The mixture of ammonium hydroxide and precipitate, with any unreacted viscous-phase material, is held until spherulitic crystals form. These crystals have the composition $Ca(NH_4)_2P_2O_7 \cdot H_2O$, which is a new compound having characteristic optical properties and X-ray pattern.

EXAMPLE

Vitreous fertilizer-grade calcium metaphosphate was crushed and screened to separate a fraction of such size as to pass a standard 20-mesh screen and be retained upon a 60-mesh screen. About 50 grams of the sized calcium metaphosphate was introduced into an extraction vessel. Distilled water was added to the extraction vessel dropwise while the vessel and contents were maintained at a temperature of about 50° C. An extract consisting of two phases was formed. These phases were: (1) a dilute aqueous solution of short-chain degradation products of calcium metaphosphate, and (2) a heavy viscous phase which was substantially immiscible with water or with the dilute aqueous solution. The phases were separated as formed by difference in specific gravity. The supernatant aqueous phase was continuously drawn off during extraction.

The viscous phase was then separated from residual supernatant aqueous solution and was placed in a closed vessel where it was mixed with an excess of concentrated ammonium hydroxide. An amorphous precipitate formed. The resulting mixture, still containing excess ammonium hydroxide, was held until spherulitic crystals formed. These crystals were then separated from mother liquor and washed. This preparation was repeated 3 times. Analyses of the products of these four runs are shown in the following table.

| Run | Composition, percent | | | | Mole ratio | | | |
|---|---|---|---|---|---|---|---|---|
| | CaO | $P_2O_5$ | $NH_3$ | $H_2O$ (diff.) | CaO | $P_2O_5$ | $NH_3$ | $H_2O$ |
| 1 | 22.8 | 50.6 | 11.3 | 15.3 | 1.14 | 1.0 | 1.87 | 2.38 |
| 2 | 22.7 | 50.9 | 11.8 | 14.6 | 1.13 | 1.0 | 1.93 | 2.26 |
| 3 | 20.9 | 52.1 | 11.9 | 15.1 | 1.02 | 1.0 | 1.90 | 2.28 |
| 4 | 20.5 | 51.7 | 12.4 | 15.4 | 1.01 | 1.0 | 2.0 | 2.35 |

These products had the same characteristic optical properties and X-ray diffraction pattern.

Monocalcium diammonium pyrophosphate products produced as described above were sent to a greenhouse for pot tests as fertilizers. Preliminary tests have shown that these products gave good results.

I claim as my invention:

A process for the production of monocalcium diammonium pyrophosphate which comprises soaking with water in a reaction vessel pure finely divided vitreous calcium metaphosphate to promote hydrolysis thereof, whereby a mixture of hydrated polymers in relatively long-chain molecules of calcium metaphosphate containing from about 30 to 60 weight percent $Ca(PO_3)_2$ is formed; producing an extract from said water-soaked calcium metaphosphate consisting of the two phases, namely, (1) a heavy viscous phase substantially immiscible with water and (2) a supernatant aqueous solution of short-chain molecular degradation products of vitreous calcium metaphosphate; continuously withdrawing the supernatant solution during extraction; separating said viscous phase from the residual supernatant solution; immediately thereafter adding an excess of concentrated ammonium hydroxide to said viscous phase; holding the resulting mixture of said viscous phase and said ammonium hydroxide until spherulitic crystals form; and withdrawing as product, crystals of monocalcium diammonium pyrophosphate, having the formula $$Ca(NH_4)_2P_2O_7 \cdot H_2O$$

References Cited in the file of this patent

Journal of Physical Chemistry, Brown et al., "Crystalline Intermediates . . . Calcium Polymetaphosphate," vol. 61, July-December 1957, pages 1669 and 1670.